UNITED STATES PATENT OFFICE.

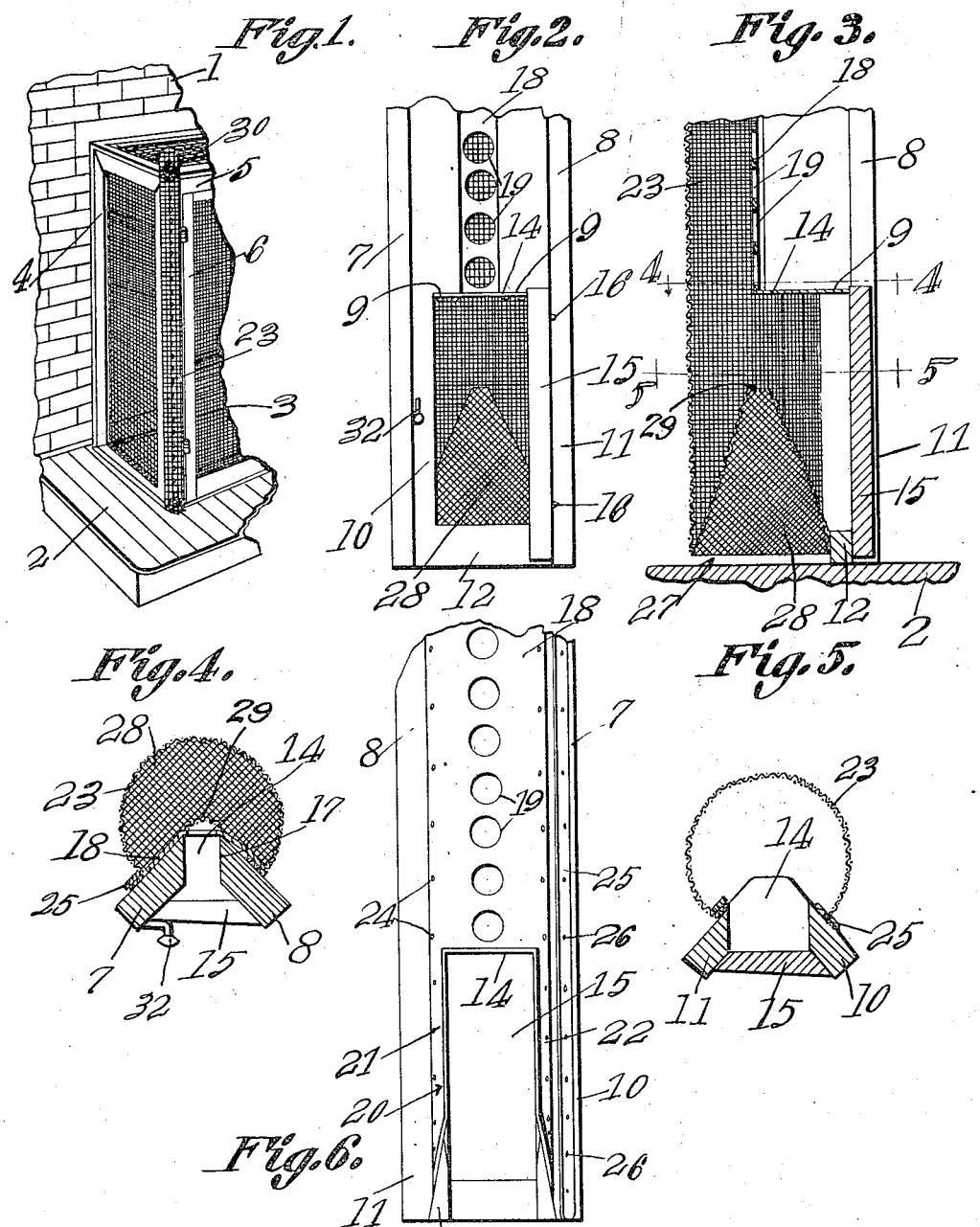

THOMAS J. HUBBARD AND WILLIAM W. HUBBARD, OF MENDOTA, ILLINOIS.

SCREEN DEVICE.

1,249,964. Specification of Letters Patent. Patented Dec. 11, 1917.

Application filed November 23, 1916. Serial No. 133,056.

*To all whom it may concern:*

Be it known that we, THOMAS J. HUBBARD and WILLIAM W. HUBBARD, citizens of the United States, residing at Mendota, in the county of La Salle, State of Illinois, have invented a new and useful Screen Device, of which the following is a specification.

The device forming the subject matter of this application is an improvement on the structure shown in Patent No. 859,385 issued on the 9th day of July, 1907 to Thomas J. Hubbard and William W. Hubbard, the present applicants.

The invention aims to improve the tubular foraminous members which are located at the corners of the vestibule shown in the patent above mentioned, and to improve those parts of the device which coöperate with the tubular members above mentioned.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1 shows in perspective, a portion of a building including a vestibule to which the present improvements have been applied;

Fig. 2 is a rear elevation showing one corner of the vestibule, the door in said corner of the vestibule being open;

Fig. 3 is a longitudinal section of the structure shown in Fig. 2, the door being closed;

Fig. 4 is a cross section on the line 4—4 of Fig. 3;

Fig. 5 is a cross section on the line 5—5 of Fig. 3; and

Fig. 6 is a front elevation of the structure shown in Fig. 2, parts being omitted.

In the drawings, the numeral 1 indicates a building provided with a platform or step 2. In the wall of the building 1 there is fashioned a portal or doorway 3. Disposed about the doorway 3 is a vestibule including a side frame 4 and a front frame 5. The front frame 5 carries a hingedly mounted door 6. The frames 4 and 5 preferably carry wire nettings, shown in the drawings. The structure above set forth is shown in our prior patent above mentioned and need not be described in greater detail.

The frame 5 includes an upright 7, and the side frame 4 includes an upright 8 located at the corner of the vestibule. Intermediate their upper and lower ends, and relatively near to their lower ends, the uprights 7 and 8 are cut away transversely to form horizontal shoulders 9 and to form extensions 10 and 11 prolonged below the shoulders, the extension 10 being a part of the upright 7, and the extension 11 being a part of the upright 8. The extensions 10 and 11 are connected at their lower ends by a bottom bar 12. Secured to the shoulders 9 is a top plate 14. The numeral 15 denotes a door hinged at 16 to the extension 11. The door 15 is adapted to swing between the extensions 10 and 11, as indicated in Fig. 5, the lower portion of the door 15 abutting against the bottom bar 12, and the upper portion of the door coöperaing with the rear edge of the top plate 14. The inner edges of the uprights 7 and 8, which define one corner of the vestibule, are beveled to form a slot 17 which extends downwardly, from the upper ends of the uprights, to the top plate 14.

Applied to the outer faces of the uprights 7 and 8 is a strip 18 which preferably is made of metal. The strip 18 is V-shaped in cross section and has, intermediate its longitudinal edges, openings 19 which communicate with the slot 17. The side portions of the strip 18 are cut back below the top plate 14 to form extensions 21 and 22.

The numeral 23 indicates an upright foraminous tube which preferably is made of wire netting. One edge of the tube 23 is bound between the extension 21 of the V-shaped strip 18 and the corresponding extension 11 of the upright 8. The opposite edge of the tube 23 is bound between a cleat 25 and the upright 7. The strip 18 is held in place on the uprights 7 and 8 by means of securing elements 24, and securing elements 26 unite the cleat 25 with the upright 7. The construction last above described is such that the tube 23 may be formed readily during the process of manufacture. One edge of the tube 23 is placed between one edge of the strip 18 and the upright 8. Said edge of the strip 18 is then nailed in place on the upright. The constituent material of the tube 23 is then bent around into circular form, and the opposite edge of the tube is bound between the cleat 25 and the upright 7, the cleat 25 being held in place by the securing elements 26.

The lower end of the tube 23 is spaced as shown at 27 from the platform or step 2. Disposed within the lower end of the tube 23 is a conical leader 28 having an opening 29 in its top. The leader 28 preferably is made out of wire netting and is secured to the lower end of the tube 24 and to the uprights 7 and 8, the lower ends of the uprights being beveled, as shown at 31, to facilitate the mounting of the leader in place.

A removable trap 30 is placed at the upper end of the tube 23, as in our prior patent above mentioned. The door 15 may be held closed by means of a latch 32 mounted in the extension 10 of the upright 7.

In practical operation, flies and other insects within the building 1, seeking light and heat, pass into the vestibule and from the vestibule pass by way of the slot 17 into the tube 23, the insects moving upwardly within the tube 23 into the trap 30. This operation of the structure is clearly set forth in our prior patent hereinbefore alluded to.

The V-shaped strip 18 is one of the important improvements in the device herein disclosed. Since this strip 18 bridges the slot 17, and since the strip is provided with the openings 19, a return of the flies from the tube 23 within the contour of the vestibule, through the slot 17, is rendered practically impossible. The strip 18, as hereinbefore set forth, constitutes a means whereby one edge of the tube 23 is held in place.

A quantity of bait may be placed on the platform 2 within the contour of the leader 28. Flies on the outside of the building, therefore, attracted by the bait, will pass within the leader 28 through the space 27 which exists between the lower end of the tube 23 and the platform 2. The flies, or other insects, passing upwardly through the opening 29 in the apex of the leader, will find their way within the tube 23, and, passing upwardly through the tube, will be caught by the trap 30. The door 15 may be opened at any time for the purpose of removing dead insects.

Having thus described the invention, what is claimed is:—

1. In a device of the class described, a building having a portal and a platform; a vestibule about the portal and embodying uprights spaced to define a slot; a strip bridging the slot and provided with openings communicating with the slot; means for securing the strip to the uprights; a tube one edge of which is bound between one upright and one edge of the strip, the lower end of the tube being spaced from the platform; a cleat connecting the other edge of the tube with the other upright; a leader in the lower end of the tube; and a trap at the upper end of the tube.

2. In a device of the class described, a building having a portal and a platform; a vestibule about the portal and embodying uprights spaced to define a slot; a strip bridging the slot and provided with openings communicating with the slot; a tube one end of which is bound between one edge of the strip and one upright; means for securing the other edge of the tube to the other upright; and a leader in the lower end of the tube, the lower end of the tube being spaced from the platform.

3. In a device of the class described, a building having a portal and a platform; a vestibule about the portal and embodying corner uprights, the uprights being cut away transversely to form shoulders and depending extensions below the shoulders; a top plate secured to the shoulders; a door hinged to one extension and coöperating with the other extension and with the top plate, the uprights being spaced above the top plate to form a slot; a tube assembled with the uprights, the slot giving access to the tube, the lower end of the tube being spaced from the platform; and a leader in the lower end of the tube, the door giving access to the interior of the tube above the leader.

In testimony that we claim the foregoing as our own, we have hereto affixed our signatures in the presence of two witnesses.

THOMAS J. HUBBARD.
WILLIAM W. HUBBARD.

Witnesses:
OSCAR STEVENS,
MARY E. ANNING.

Copies of this patent may be obtained for five cents each, by addressing the "Commissioner of Patents, Washington, D. C."